(12) United States Patent
Meier et al.

(10) Patent No.: US 10,501,074 B2
(45) Date of Patent: Dec. 10, 2019

(54) METHODS AND SYSTEMS FOR REDUCING VEHICLE AND ANIMAL COLLISIONS

(71) Applicant: Robert Bosch GmbH, Stuttgart (DE)

(72) Inventors: Michael Meier, Walled Lake, MI (US); Ryan Rummer, South Lyon, MI (US); Frederic Marcel Sejalon, Commerce Township, MI (US); Robert Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 15/618,246

(22) Filed: Jun. 9, 2017

(65) Prior Publication Data
US 2018/0354505 A1  Dec. 13, 2018

(51) Int. Cl.
*B60W 30/085* (2012.01)
*B60W 30/095* (2012.01)
(Continued)

(52) U.S. Cl.
CPC .......... *B60W 30/085* (2013.01); *A01M 29/10* (2013.01); *A01M 29/18* (2013.01); *B60W 10/18* (2013.01); *B60W 10/22* (2013.01); *B60W 30/0956* (2013.01); *B60W 2510/182* (2013.01); *B60W 2510/22* (2013.01); *B60W 2520/16* (2013.01); *B60W 2550/10* (2013.01);
(Continued)

(58) Field of Classification Search
CPC .... B60W 30/085; B60W 10/18; B60W 10/22; B60W 30/0956; B60W 2720/16; B60W 2510/22; B60W 2520/16; B60W 2550/10; B60W 2550/22; B60W 2710/182; B60W 2710/22; B60W 2510/182; A01M 29/10; A01M 29/18
See application file for complete search history.

(56) References Cited

U.S. PATENT DOCUMENTS 3,802,727 A * 4/1974 Beckley .................. B60R 19/02
293/120
4,042,057 A * 8/1977 Beckley .................. B60R 19/22
180/90

(Continued)

FOREIGN PATENT DOCUMENTS

DE  202006001194 U1  5/2006
DE  102011120223 A1  6/2013
(Continued)

*Primary Examiner* — Frederick M Brushaber
(74) *Attorney, Agent, or Firm* — Michael Best & Friedrich LLP

(57) ABSTRACT

Methods and systems for reducing vehicle and animal collisions. One system includes an electronic processor configured to receive vehicle data. The electronic processor is also configured to determine a collision risk of the vehicle based on the vehicle data, the collision risk representing a probability of a collision between the vehicle and an animal. The electronic processor is also configured to adjust a collision parameter of the vehicle based on the collision risk. The electronic processor is also configured to identify when an animal is in a path of the vehicle based on the vehicle data. The electronic processor is also configured to, when an animal is identified in the path of the vehicle, automatically perform a vehicle operation based on the adjusted collision parameter.

19 Claims, 3 Drawing Sheets

(51) Int. Cl.
 *B60W 10/22* (2006.01)
 *B60W 10/18* (2012.01)
 *A01M 29/18* (2011.01)
 *A01M 29/10* (2011.01)

(52) U.S. Cl.
 CPC ... *B60W 2550/22* (2013.01); *B60W 2710/182* (2013.01); *B60W 2710/22* (2013.01); *B60W 2720/16* (2013.01)

(56) References Cited

U.S. PATENT DOCUMENTS

| | | | |
|---|---|---|---|
| 5,969,593 A * | 10/1999 | Will | A01M 29/10 119/174 |
| 6,252,496 B1 * | 6/2001 | Jackson | A01M 29/18 119/174 |
| 6,330,500 B1 * | 12/2001 | Moriyama | B60R 21/013 180/232 |
| 7,997,375 B2 | 8/2011 | Shaw | |
| 8,786,421 B2 | 7/2014 | Donna | |
| 9,102,307 B2 * | 8/2015 | Hasselblad | B60R 21/38 |
| 9,387,839 B2 | 7/2016 | Hardaa et al. | |
| 9,701,307 B1 * | 7/2017 | Newman | B60W 50/16 |
| 9,922,374 B1 * | 3/2018 | Vose | B60Q 9/008 |
| 10,222,228 B1 * | 3/2019 | Chan | G01C 21/3697 |
| 2002/0126022 A1 * | 9/2002 | Ellis | A61H 3/061 340/901 |
| 2003/0090391 A1 * | 5/2003 | Philiben | B64D 47/06 340/945 |
| 2005/0116828 A1 * | 6/2005 | Perlo | A01M 29/18 340/573.2 |
| 2006/0052929 A1 * | 3/2006 | Bastian | B60K 28/06 701/93 |
| 2010/0236497 A1 * | 9/2010 | Philiben | A01K 11/008 119/712 |
| 2012/0182425 A1 | 7/2012 | Higgins-Luthman et al. | |
| 2013/0274999 A1 * | 10/2013 | Bengtsson | B60Q 1/085 701/36 |
| 2014/0074359 A1 | 3/2014 | Lane | |
| 2015/0165937 A1 | 6/2015 | Harda et al. | |
| 2015/0166062 A1 * | 6/2015 | Johnson | B60W 30/12 701/41 |
| 2016/0189542 A1 * | 6/2016 | Myer | G08G 1/096783 340/905 |
| 2016/0264135 A1 | 9/2016 | Yamakado et al. | |
| 2016/0355181 A1 * | 12/2016 | Morales Teraoka | B60W 30/14 |
| 2017/0154241 A1 * | 6/2017 | Shambik | B60R 1/00 |
| 2017/0329332 A1 * | 11/2017 | Pilarski | B60W 50/0097 |
| 2017/0349169 A1 * | 12/2017 | Deshpande | B60W 10/18 |
| 2018/0273030 A1 * | 9/2018 | Weldon | B60W 30/09 |
| 2018/0286076 A1 * | 10/2018 | Lindgren | G06T 7/85 |
| 2019/0143967 A1 * | 5/2019 | Kutila | G08G 1/162 |

FOREIGN PATENT DOCUMENTS

| | | |
|---|---|---|
| DE | 102012005709 A1 | 9/2013 |
| JP | 2009193130 A | 8/2009 |
| JP | 2015006153 A | 1/2015 |

* cited by examiner

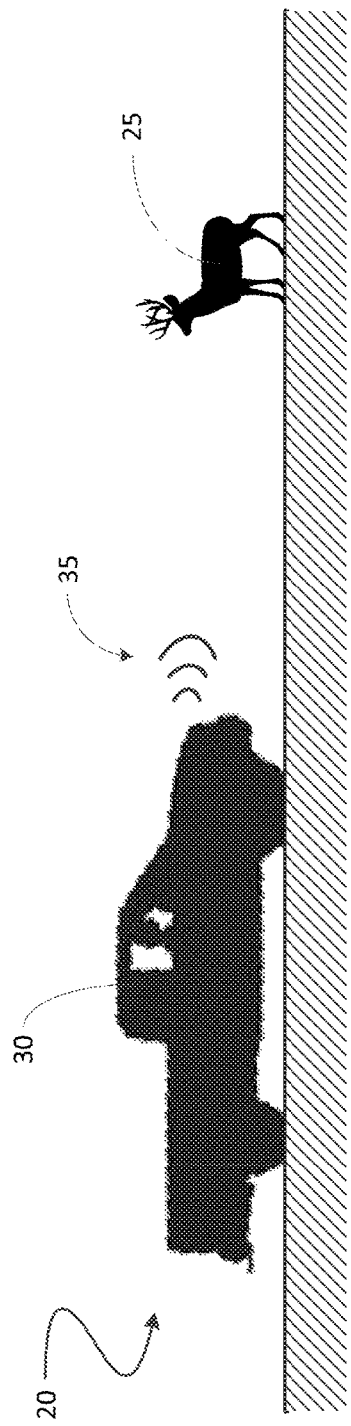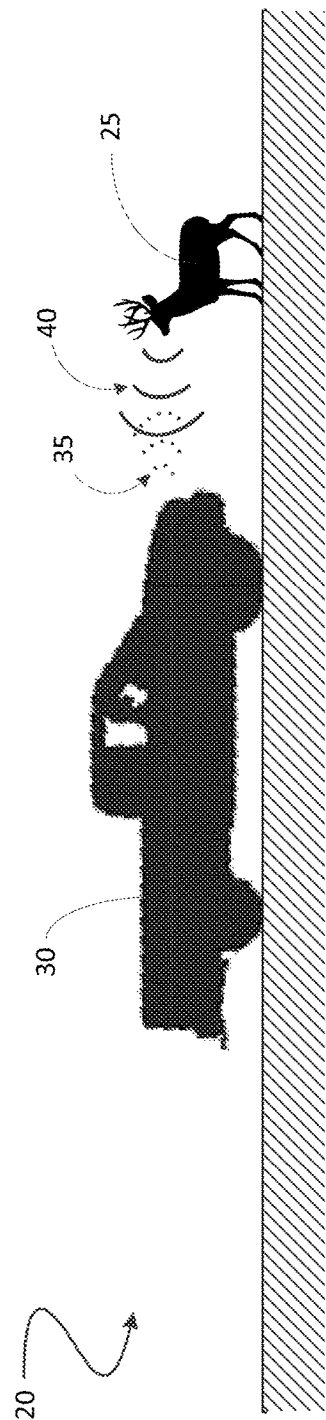
FIG. 1A
FIG. 1B

METHODS AND SYSTEMS FOR REDUCING VEHICLE AND ANIMAL COLLISIONS

FIELD

Embodiments relate to methods and systems for reducing vehicle and animal collisions, such as a vehicle colliding with a deer.

SUMMARY

Collisions between a vehicle and an animal, such as a deer, are a common occurrence, which may result in costly vehicle repairs. However, some collisions between a vehicle and an animal result in serious bodily injury or death to passengers of the vehicle. Accordingly, embodiments described herein relate to methods and systems for preventing a vehicle from colliding with an animal. For example, one embodiment provides a system for reducing vehicle and animal collisions. The system includes an electronic processor configured to receive vehicle data. The electronic processor is also configured to determine a collision risk of the vehicle based on the vehicle data, the collision risk representing a probability of a collision between the vehicle and an animal. The electronic processor is also configured to adjust a collision parameter of the vehicle based on the collision risk. The electronic processor is also configured to identify when an animal is in a path of the vehicle based on the vehicle data. The electronic processor is also configured to, when an animal is identified in the path of the vehicle, automatically perform a vehicle operation based on the adjusted collision parameter.

Another embodiment provides a method for reducing vehicle and animal collisions. The method includes receiving, with an electronic processor, vehicle data. The method also includes determining, with the electronic processor, a collision risk of the vehicle based on the vehicle data, the collision risk representing a probability of a collision between the vehicle and an animal. The method also includes adjusting, with the electronic processor, a collision parameter of the vehicle based on the collision risk. The method also includes identifying, with the electronic processor, when an animal is in a path of the vehicle based on the vehicle data. The method also includes, when an animal is identified in the path of the vehicle, automatically performing, with the electronic processor, a vehicle operation based on the adjusted collision parameter.

Other aspects of various embodiments will become apparent by consideration of the detailed description and accompanying drawings.

BRIEF DESCRIPTION OF THE DRAWINGS

FIGS. 1A and 1B illustrate a system for detecting an animal in a path of a vehicle.

DETAILED DESCRIPTION

Figure 2:
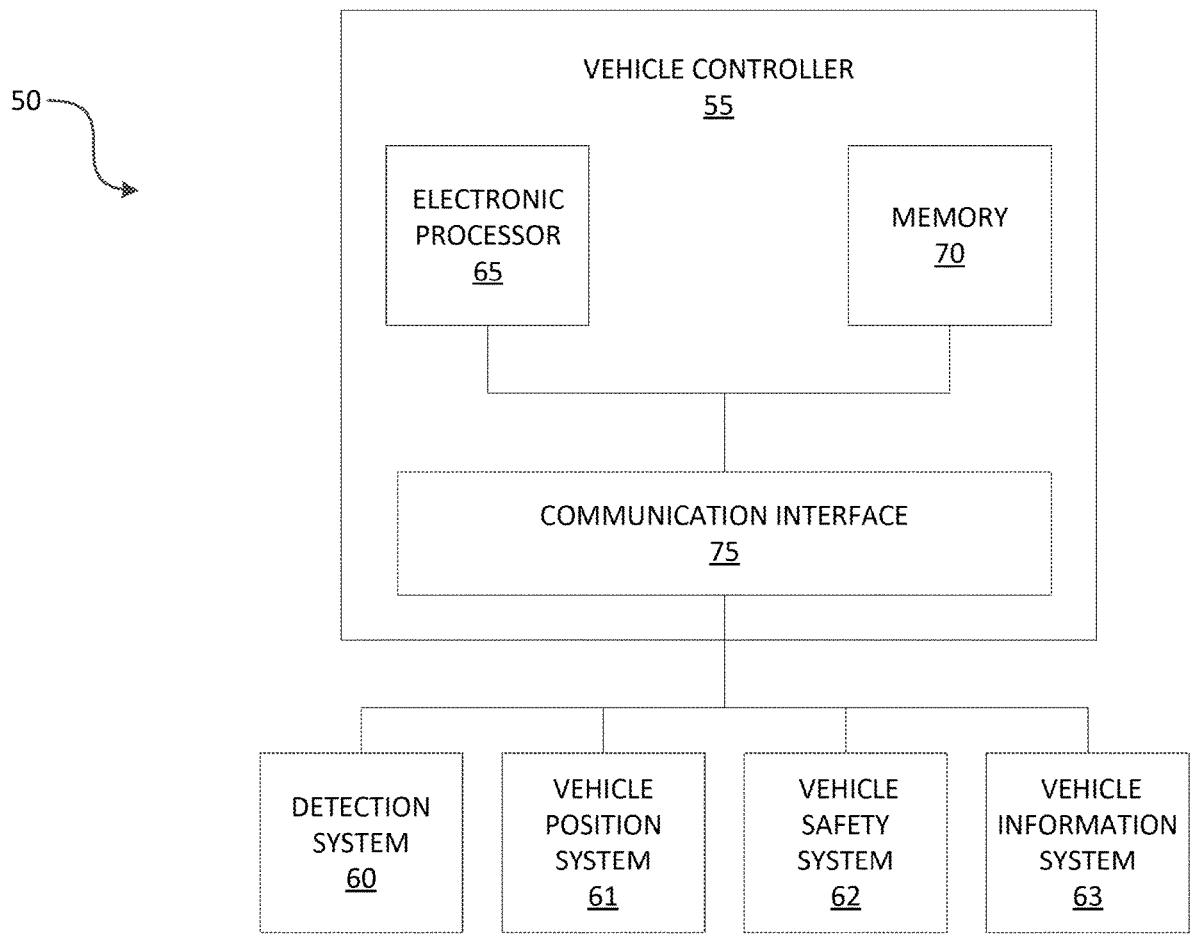
FIG. 2 illustrates a system for reducing vehicle and animal collisions in accordance with some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIGS. 1A and 1B illustrate a system 20 for detecting an animal 25 (for example, a deer) in a path of a vehicle 30. In the example illustrated in FIG. 1A, a signal 35 (referred to as a "detection signal" to indicate that the signal is used to detect the presence of the animal 25) is transmitted from the vehicle 30. In the example shown, the signal is transmitted outwardly from the front of the vehicle 30. The detection signal 35 is transmitted via a detection sensor or sensor system (for example, a combined ultrasonic transmitter and receiver, a combined radar transmitter and receiver, and the like) of the vehicle 30. As illustrated in FIG. 1B, when the animal 25 is in the path of the vehicle 30, the detection sensor system receives a reflection or response signal 40.

FIG. 2 illustrates a system 50 for reducing vehicle and animal collisions, such as the vehicle 30 from colliding with the animal 25, according to some embodiments. In the example shown, the system 50 includes a vehicle controller 55, a detection system 60, a vehicle position system 61, a vehicle safety system 62, and a vehicle information system 63. In some embodiments, the system 50 includes fewer, additional, or different components than those illustrated in FIG. 2 in various configurations and may perform additional functionality than the functionality described herein. For example, the system 50 may include other systems of the vehicle 30, such as a vehicle suspension system, a vehicle braking system, and the like. The detection system 60, the vehicle position system 61, the vehicle safety system 62, the vehicle information system 63, or a combination thereof may be distributed among multiple electronic processors or processing units within the vehicle. Each processing unit may include various, types of electronic processors, memory, software, circuitry, and other components. Alternatively or in addition, the detection system 60, the vehicle position system 61, the vehicle safety system 62, the vehicle information system 63, or a combination thereof may be combined into a single processing unit.

As illustrated in FIG. 2, the vehicle controller 55 includes an electronic processor 65 (for example, a microprocessor, an application specific integrated circuit, or another suitable electronic device), a memory 70 (for example, one or more non-transitory computer-readable storage mediums), and a communication interface 75. The electronic processor 65, the memory 70, and the communication interface 75 communicate wirelessly, over one or more data connections or buses, or a combination thereof. The vehicle controller 55 illustrated in FIG. 2 represents one example, and, in some embodiments, the vehicle controller 55 may include fewer, additional, or different components in different configurations than illustrated in FIG. 2. Also, in some embodiments, the vehicle controller 55 performs functionality in addition to the functionality described herein. Additionally, in some embodiments, the vehicle controller 55 is a preexisting vehicle controller, such as an engine controller, of the vehicle 30.

The electronic processor 65 is configured to retrieve instructions from the memory 70 and execute instructions to perform a set of functions, including the methods described herein. For example, in some embodiments, the electronic processor 65 executes instructions for generating control signals to reduce vehicle and animal collisions. The memory 70 may include combinations of different types of memory, such as read-only memory ("ROM"), random access memory ("RAM"), or another non-transitory computer readable medium. As noted above, the memory 70 stores instructions executed by the electronic processor 65. The memory 70 may also store data, such as vehicle data from the detection system 60, the vehicle position system 61, the vehicle information system 63, another vehicle system, or a combination thereof. Accordingly, the memory 70 may store firmware, one or more applications, program data, filters, rules, one or more program modules, and other executable instructions or data.

The communication interface 75 allows the vehicle controller 55 to communicate with devices external to the vehicle controller 55 (for example, receive input from and provide output to devices external to the vehicle controller 55). For example, the vehicle controller 55 communicates with the detection system 60, the vehicle position system 61, the vehicle safety system 62, the vehicle information system 63, another vehicle system, or a combination thereof through the communication interface 75. In some embodiments, the communication interface 75 includes a port for receiving a wired connection with the detection system 60, the vehicle position system 61, the vehicle safety system 62, the vehicle information system 63, another vehicle system, or a combination thereof. Alternatively or in addition, the communication interface 75 includes a transceiver for establishing a wireless connection with the detection system 60, the vehicle position system 61, the vehicle safety system 62, the vehicle information system 63, another vehicle system, or a combination thereof. Alternatively or in addition, the communication interface 75 communicates with a communication bus (for example, a controller area network ("CAN")) to indirectly communicate with the detection system 60, the vehicle position system 61, the vehicle safety system 62, the vehicle information system 63, another vehicle system, or a combination thereof.

As noted above, the detection system 60, the vehicle position system 61, and the vehicle information system 63 provide data regarding the vehicle 30 to the vehicle controller 55. In some embodiments, the detection system 60, the vehicle position system 61, the vehicle information system 63, or a combination thereof are systems preexisting in the vehicle 30.

The detection system 60 is configured to collect data of the environment surrounding the vehicle 30. For example, the data may include a presence of an animal in the path of the vehicle 30, a presence of a road sign, content of a road sign, and the like. In some embodiments, the detection system 60 is configured to collect data for detecting the presence of an animal in a path of the vehicle 30. Although not illustrated in FIG. 2, the detection system 60 may include one or more animal detection sensors, such as ultrasonic sensors, radar sensors, image sensors, and the like. Alternatively or in addition, in some embodiments, the detection system 60 collects data for detecting and reading content of a road sign, such as a road sign with an animal warning. Accordingly, in some embodiments, the detection system 60 is configured to collect data via object recognition. For example, the detection system 60 may recognize when the vehicle 30 passes a road sign with a deer warning indicating that the surrounding area has a high deer population. In some embodiments, the detection system 60 is configured to detect the animal 25 from more than one orientation (for example, a side view of the animal 25, a back view of the animal 25, or a front view of the animal 25). Additionally, in some embodiments, the detection system 60 is configured to identify a breed classification of the animal 25. For example, the detection system 60 may use object recognition to determine that the animal 25 is a deer.

The vehicle position system 61 is configured to collect positional data relating to the vehicle 30. The positional data of the vehicle 30 may include, for example, a position of the vehicle 30, a direction of travel of the vehicle 30, and the like. The vehicle position system 61 may collect the positional data of the vehicle 30 in real-time. In some embodiments, the vehicle position system 61 is a navigation system preexisting in the vehicle 30, such as a global positioning system (GPS) of the vehicle 30.

The vehicle information system 63 is configured to collect temporal data relating to the vehicle 30. The temporal data of the vehicle 30 may include, for example, a time of year (for example, a season, a month, or a day), a time of day (for example, morning, an actual time of day, dusk, or post-sunset), and the like. Accordingly, the vehicle information system 63 may include, for example, a vehicle clock, a vehicle calendar, another vehicle component, or a combination thereof. In some embodiments, the vehicle information system 63 is an infotainment system of the vehicle 30.

The vehicle safety system 62 is configured to control one or more safety operations for the vehicle 30. In some embodiments, the vehicle safety system 62 includes one or more preexisting safety systems of the vehicle 30. For example, the vehicle safety system 62 may include an electronic stability control system, traction control system, anti-lock braking system, an autonomous emergency braking system, a collision warning system, other vehicle safety systems, or a combination thereof.

Figure 3:
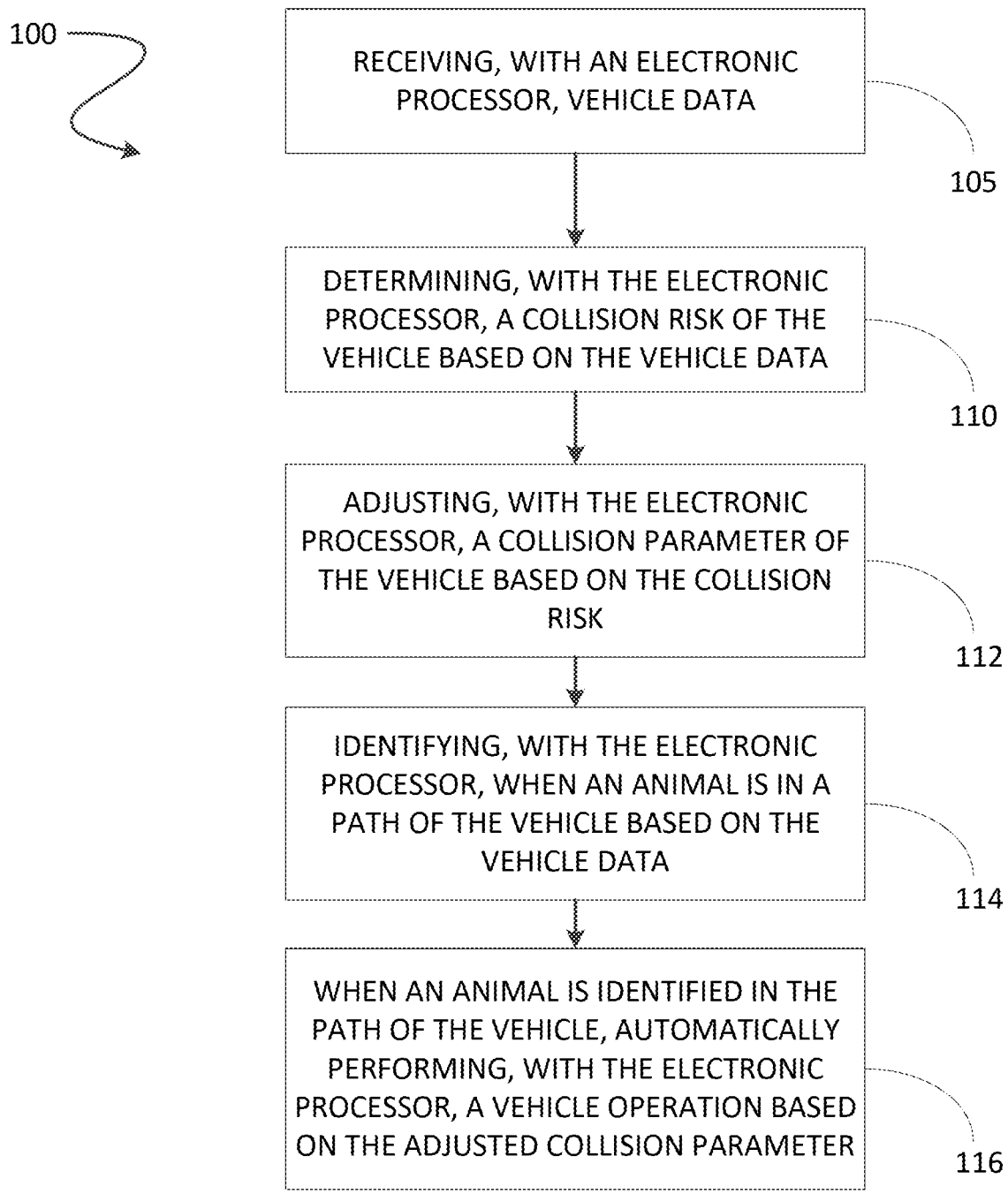
FIG. 3 is a flowchart illustrating a method for reducing vehicle and animal collisions performed by the system of FIG. 1 in accordance with some embodiments.

As noted above, the electronic processor 65 of the vehicle controller 55 executes instructions for reducing vehicle and animal collisions. In particular, the electronic processor 65 executes instructions to perform the method 100 illustrated in FIG. 3 for reducing the likelihood of the vehicle 30 colliding with the animal 25. As illustrated in FIG. 3, the method 100 includes receiving, with the electronic processor 65, vehicle data (at block 105). The electronic processor 65 receives the vehicle data via the communication interface 75 of the vehicle controller 55. The vehicle data is received from the detection system 60, the vehicle position system 61, the vehicle information system 63, or a combination thereof. The vehicle data includes, for example, the data collected by the detection system 60, the positional data collected by the vehicle position system 61, the temporal data collected by the vehicle information system 63, or a combination thereof. In some embodiments, the vehicle data includes additional or different vehicle data. In some embodiments, the vehicle data received by the electronic processor 65 is stored in the memory 70 of the vehicle controller 55.

After the electronic processor 65 receives the vehicle data, the electronic processor 65 determines a collision risk of the vehicle 30 based on the vehicle data (at block 110). The collision risk of the vehicle 30 represents a probability of a collision between the vehicle 30 and the animal 25. In some embodiments, the electronic processor 65 determines the collision risk of the vehicle 30 based on the risk of an area in which the vehicle 30 is traveling through. For example, when the vehicle 30 travels through an area having a high risk of a collision with an animal, the electronic processor 65 may determine a higher collision risk of the vehicle 30. However, when the vehicle 30 travels through an area having a low risk of a collision with an animal, the electronic processor 65 may determine a lower collision risk of the vehicle 30. The electronic processor 65 may determine a risk of an area based on the positional data received from the vehicle position system 61. For example, when the positional data indicates that the vehicle 30 is traveling through an urban area, such as a heavily populated city, the electronic processor 65 may determine that the vehicle 30 is traveling through a low risk area. However, when the positional data indicates that the vehicle 30 is traveling through a heavily wooded area, the electronic processor 65 may determine that the vehicle is traveling through a high risk area. Alternatively or in addition, the electronic processor 65 determines a risk of an area based on the data received from the detection system 60. For example, when the data indicates that a road sign with an animal warning was recognized, the electronic processor 65 may determine that the vehicle 30 is traveling through a high risk area.

In some embodiments, the electronic processor 65 determines the collision risk of the vehicle 30 based on when the vehicle 30 is traveling. For example, the electronic processor 65 may determine a higher collision risk of the vehicle 30 when the vehicle 30 is traveling at a time known for vehicle collisions with animals, such as during deer hunting season, at dawn or dusk, and the like. The electronic processor 65 may determine whether the vehicle 30 is traveling during a time posing a known collision risk based on the temporal data received from the vehicle information system 63. For example, when the temporal data indicates that the vehicle 30 is traveling during a time of day commonly associated with deer movement, such as dawn or dusk, the electronic processor 65 may determine a higher collision risk of the vehicle 30. Alternatively or in addition, when the temporal data indicates that the vehicle 30 is traveling during a time of year commonly associated with deer movement, such as during deer hunting season, the electronic processor 65 may determine a higher collision risk of the vehicle 30.

The electronic processor 65 also adjusts a collision parameter of the vehicle 30 based on the collision risk (at block 112). In some embodiments, the collision parameter adjusted by the electronic processor 65 includes one or more parameters of the vehicle safety system 62. For example, the electronic processor 65 may adjust the collision parameter of the vehicle 30 by prefilling brakes of the vehicle 30, limiting a target deceleration of the vehicle 30, and the like. Alternatively or in addition, the electronic processor 65 may adjust an activation threshold of the vehicle safety system 62. For example, the electronic processor 65 may adjust the activation threshold of the vehicle safety system 62 so that the vehicle safety system 62 is activated at a higher speed. Alternatively or in addition, the electronic processor 65 adjusts the collision parameter by adjusting a collision response procedure of the vehicle safety system 62, such as where to autonomously steer the vehicle 30. In some embodiments, adjusting a collision response procedure of the vehicle safety system 62 includes reprioritizing the collision response procedure such that minimizing injury to one or more occupants of the vehicle 30 is prioritized over minimizing injury to the animal 25. For example, preventing the vehicle 30 from colliding with the animal 25 may pose greater risk of injury to one or more occupants of the vehicle 30, such as a second vehicle colliding with the vehicle 30 as a result of the sudden stopping of the vehicle 30 or losing control of the vehicle 30 as a result of the evasive maneuvers required to avoid the collision with the animal 25. In some embodiments, prior to adjusting the collision parameter of the vehicle 30, the electronic processor 65 compares the collision risk of the vehicle 30 with a predetermined collision risk threshold. When the collision risk of the vehicle 30 exceeds the predetermined collision risk threshold, the electronic processor 65 adjusts the collision operating parameter of the vehicle 30.

The electronic processor 65 also identifies when the animal 25 is in a path of the vehicle 30 based on the vehicle data (at block 114). When the electronic processor 65 identifies that the animal 25 is in the path of the vehicle 30, the electronic processor 65 automatically performs a vehicle operation (at block 116). The vehicle operation performed by the electronic processor 65 is based on the adjusted collision parameter. In some embodiments, the electronic processor 65 performs the vehicle operation to frighten the animal 25 to move out of the path of the vehicle 30. For example, the vehicle operation may include flashing headlights of the vehicle 30, outputting an ultrasonic frequency, and the like. In some embodiments, the vehicle operation performed by the electronic processor 65 includes a braking operation, such as a brake jerk. The electronic processor 65 may perform the braking operation to notify the driver of the vehicle 30 of a potential collision with the animal 25. Alternatively or in addition, the vehicle operation performed by the electronic processor 65 includes adjusting the pitch of the vehicle 30 (via a suspension system of the vehicle 30). For example, the electronic processor 65 may control a suspension system of the vehicle 30 by raising the pitch of the vehicle 30 just before impact to minimize risk of the animal 25 rolling over the hood of the vehicle 30.

In some embodiments, the electronic processor 65 also determines a breed classification of the animal 25 in the path of the vehicle 30 as part of block 114. The electronic processor 65 may determine the breed classification of the animal 25 based on the vehicle data. As noted above, the detection system 60 is configured to identify a breed classification of the animal 25 using, for example, object recognition. Accordingly, the vehicle data may include an identification of a breed classification of the animal 25. The vehicle data may also include additional information regarding the breed classification, such as known behavior of the breed classification. For example, the vehicle data may indicate that a first breed classification tends to freeze when faced with danger while a second breed classification tends to run when faced with danger. When the electronic processor 65 determines the breed classification of the animal 25, as part of block 116, the electronic processor 65 may perform the vehicle operation based on the breed classification of the animal, the additional information regarding the breed classification, or a combination thereof. For example, when the electronic processor 65 determines that the animal 25 is a skunk, the electronic processor 65 may drive straight over the skunk. However, when the electronic processor 65 determines that the animal 25 is a deer, the electronic processor may perform evasive maneuvers to avoid hitting the deer.

In some embodiments, the electronic processor 65 continuously monitors the collision risk of the vehicle 30 based on updated or new vehicle data received from the detection system 60, the vehicle position system 61, the vehicle information system 63, another vehicle system, or a combination thereof. Based on the updated vehicle data, the electronic processor 65 updates the collision risk of the vehicle 30. The electronic processor 65 also updates (re-adjusts) the adjusted collision parameter of the vehicle 30 based on the updated collision risk of the vehicle 30.

Various features and advantages of certain embodiments are set forth in the following claims.

What is claimed is:

1. A system for reducing vehicle and animal collisions, the system comprising:
   an electronic processor configured to
     receive vehicle data including at least one selected from a group consisting of a time of day, a time of year, and an identified road sign, wherein the vehicle data is collected prior to an animal being within a path of a vehicle,
     determine a current collision risk of the vehicle based on the vehicle data, the current collision risk representing a probability of a future collision between the vehicle and an animal,
     adjust a collision parameter of the vehicle based on the current collision risk,
     after adjusting the collision parameter of the vehicle, identify an animal in the path of the vehicle based on the vehicle data, and
     in response to identifying the animal in the path of the vehicle, automatically perform a vehicle operation based on the adjusted collision parameter.

2. The system of claim 1, wherein the electronic processor is further configured to
   determine a risk of an area that the vehicle is traveling through based on the vehicle data, and
   determine the current collision risk of the vehicle based on the risk of the area that the vehicle is traveling through.

3. The system of claim 1, wherein the electronic processor is further configured to
   compare the current collision risk with a predetermined collision risk threshold, and
   adjust the collision parameter of the vehicle when the current collision risk exceeds the predetermined collision risk threshold.

4. The system of claim 1, wherein the vehicle operation includes at least one selected from a group consisting of flashing headlights of the vehicle and outputting an ultrasonic frequency.

5. The system of claim 1, wherein the electronic processor is configured to adjust the collision parameter of the vehicle by prefilling brakes of the vehicle.

6. The system of claim 1, wherein the vehicle operation includes adjusting a suspension of the vehicle to increase a pitch of the vehicle prior to the vehicle colliding with the animal.

7. The system of claim 1, wherein the electronic processor is configured to adjust the collision parameter by limiting a target deceleration of the vehicle.

8. The system of claim 1, wherein the electronic processor is configured to adjust the collision parameter by modifying an activation threshold of a safety system of the vehicle.

9. The system of claim 1, wherein the electronic processor is configured to adjust the collision parameter by adjusting a collision response procedure of a safety system of the vehicle, wherein the collision response procedure controls where to autonomously steer the vehicle.

10. A method for reducing vehicle and animal collisions, the method comprising:
    receiving, with an electronic processor, a first set of vehicle data, wherein the first set of vehicle data is collected before an animal is in a path of a vehicle;
    determining, with the electronic processor, a current collision risk of the vehicle based on the first set of vehicle data, the current collision risk representing a probability of a future collision between the vehicle and an animal;
    adjusting, with the electronic processor, a collision parameter of the vehicle based on the current collision risk;
    after adjusting the collision parameter of the vehicle,
      receiving, with the electronic processor, a second set of vehicle data, the second set of vehicle data collected after adjusting the collision parameter of the vehicle;
      identifying, with the electronic processor, that an animal is in the path of the vehicle based on the second set of vehicle data; and
    in response to identifying the animal in the path of the vehicle, automatically performing, with the electronic processor, a vehicle operation based on the adjusted collision parameter.

11. The method of claim 10, further comprising:
    identifying a road sign based on the vehicle data; and
    determining the current collision risk of the vehicle based on the road sign.

12. The method of claim 11, wherein determining the current collision risk of the vehicle includes determining the current collision risk of the vehicle based on a collision risk associated with an area that the vehicle is currently traveling through.

13. The method of claim 10, further comprising:
    comparing the current collision risk with a predetermined collision risk threshold; and
    adjusting the collision parameter of the vehicle when the current collision risk exceeds the predetermined collision risk threshold.

14. The method of claim 10, wherein automatically performing the vehicle operation includes performing a brake jerk, wherein the brake jerk notifies a driver of the vehicle of a potential collision with the animal.

15. The method of claim 10, wherein adjusting the collision parameter of the vehicle includes prefilling brakes of the vehicle.

16. The method of claim 10, wherein adjusting the collision parameter of the vehicle includes limiting a target deceleration of the vehicle.

17. The method of claim 10, wherein adjusting the collision parameter of the vehicle includes reprioritizing a collision response procedure of a safety system of the vehicle to prioritize minimizing injury to one or more occupants of the vehicle over minimizing injury to the animal.

18. The method of claim 10, further comprising:
determining a breed classification of the animal; and
automatically performing the vehicle operation based on the breed classification of the animal.

19. The method of claim 10, further comprising:
before receiving the second set of vehicle data,
    receiving a third set of vehicle data,
    determining an updated collision risk based on the third set of vehicle data, and
    re-adjusting the collision parameter of the vehicle based on the updated collision risk,
wherein the vehicle operation is performed based on the re-adjusted collision parameter of the vehicle.

* * * * *